(12) United States Patent
Delon

(10) Patent No.: US 11,903,405 B2
(45) Date of Patent: Feb. 20, 2024

(54) FOOD BAR, AND METHOD OF MAKING A FOOD BAR

(71) Applicant: N'SHAPE BAR LLC, Las Vegas, NV (US)

(72) Inventor: Nina Leona Delon, Las Vegas, NV (US)

(73) Assignee: N'SHAPE BAR LLC, Las Vegas, NV (US)

(*) Notice: Subject to any disclaimer, the term of this patent is extended or adjusted under 35 U.S.C. 154(b) by 0 days.

(21) Appl. No.: 18/045,146

(22) Filed: Oct. 8, 2022

(65) Prior Publication Data
US 2023/0111953 A1    Apr. 13, 2023

Related U.S. Application Data

(63) Continuation of application No. 16/988,603, filed on Aug. 8, 2020, now Pat. No. 11,490,648.

(51) Int. Cl.
*A23P 20/25* (2016.01)
*A23P 30/10* (2016.01)
*A23L 25/00* (2016.01)

(52) U.S. Cl.
CPC .......... *A23P 20/25* (2016.08); *A23L 25/30* (2016.08); *A23P 30/10* (2016.08); *A23V 2002/00* (2013.01)

(58) Field of Classification Search
CPC ........... A23P 20/20; A23P 30/10; A23L 25/30
See application file for complete search history.

(56) References Cited

U.S. PATENT DOCUMENTS 6,299,916 B1    10/2001   Dally

OTHER PUBLICATIONS

"Tahini Sauce" Jun. 10, 2020 https://www.twopurplefigs.com/perfect-tahini-sauce/ (Year: 2020).*
Shoemaker, Caitlin. "3 Savory Energy Ball Recipes for On the Go Snacking" Apr. 5, 2018 (Year: 2018).*
"8 Ways to Use Tahini in Healthy Cooking & Baking" Jul. 14, 2016 https://www.spamellab.com/2016/06/8-ways-to-use-tahini-in-healthy-cooking-baking/#:~:text=Found%20in%20many%20Middle%20Eastern%20dishes%2C%20it%20also,and%20nut%20allergy%20baking%20as%20an%20alternative%20ingredient. (Year: 2016).*
Kirsten "Lemon Bars with Shortbread Crust" Jul. 29, 2013, http://www.mykitcheninthe rockies.com/2013/07/29/lemon-bars-with-shortbread-crust/ (Year: 2013).
"What are Width, Height, Thickness, and Distance?" Mar. 29, 2020 http://www.reference.com/science/width-height-thickness-distance-d9d13e4336ad4ea0 (Year 2020).
oldwayspt.org "Lemon Bars with Tahini Cookie Crust," https://oldwayspt.org/recipes/lemon-bars-tahini-cookie-crust (Year: 2019)).
Jampel "Tahini Billionaire Bars," Mar. 22, 2020 https://www.bonappetit.com/recipe/tahini-billionaire-bars (Year: 2020).

(Continued)

*Primary Examiner* — Katherine D Leblanc

(57) ABSTRACT

A food bar, and a method for making the food bar. The food bar includes a crust, the crust having a binding agent including a sesame component, the sesame component including a combination of sesame powder, sesame paste. The food bar also includes a filling within the crust, The crust to filling weight ratio between is about 1:1.

7 Claims, 7 Drawing Sheets

(56) References Cited

OTHER PUBLICATIONS

Whattocooktoday.com, "How to Make Black Sesame Paste and Black Sesame Powder" Aug. 4, 2020, https://whattocooktoday.com/black-sesame-paste-and-black-sesame-powder.html (Year: 2020).
self.com "21 Ways to Use Nutritional Yeast" Jan. 23, 2019 https://www.self.com/gallery/nutritional-yeast-recipes (Year: 2019).

* cited by examiner

_US 11,903,405 B2_

FOOD BAR, AND METHOD OF MAKING A FOOD BAR

CROSS-REFERENCE TO RELATED APPLICATIONS

This application is a continuation of U.S. Nonprovisional application Ser. No. 16/988,603, filed on Aug. 8, 2020, the contents of which are hereby incorporated by reference.

TECHNICAL FIELD

The present disclosure relates generally to a food bar, and more specifically, a food bar composition with a crust and a method of making the food bar.

BACKGROUND

The protein bar market is one of the fastest growing markets in the food industry. This market is highly fragmented, with low barriers to entry. In general, plant-based food industry has experienced growth of over 20 percent in dollar sales over last year.

Many individuals including health conscious eater, people seeking an affordable and convenient healthy meal replacement, people seeking body-building or muscle healing enhancement, vegans, people with food allergies, and diabetic patients all look for a food bar that can be carried easily while suit their nutritional needs as a convenient meal replacement on the go. However, existing food bars have high sugar content and are made with multiple complex industrial processes that both add to cost and decreases nutritional values. Also, vegans in particular struggle to find convenient protein alternatives.

Additionally, most food bars are dry in texture and hard to swallow, due to the nature of protein powder. Low sugar bars in particular, which rely on artificial sweeteners are exceptionally dry. Adding sugar-based syrups may reduce the dryness of the food bars, but they may add to the excess sugar content of the food bars, which may be problematic for diabetic patients.

Additionally, there is a dearth of savory protein bars with naturally low sugar content, because it is difficult to maintain taste without adding excessive amount of sugar. The limited taste variations coupled with high sugar or sweeteners content forces consumers to rethink whether protein bars may be considered a healthy food product.

Further, the food bar options available in the market today only offer sweet assortments, which allow only sweet flavors to come out well. As such, these sweet food bars are treated more as a "snack" with limited nutritional value, as opposed to being a real meal replacement bar in which health conscious people can consume more than one bar per day.

Also, products used to create the food bars often have inflammatory qualities, or induce allergies, including milk, egg, seafood, or soy. Some of these ingredients are responsible for 90% of serious food allergies.

Further, a process is lacking to make savory protein bars that maintains freshness of the ingredients, taste, and shape in a variety of temperature and conditions without spilling of the bar's contents, crumbling of the bar itself, or other forms of deformation.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a food bar. The food bar includes a crust, the crust having a binding agent including a sesame component, the sesame component including a combination of sesame powder, sesame paste, nutritional yeast, water, and salt. The food bar also includes a filling within the crust, The crust to filling weight ratio between is about 1:1.

Certain embodiments disclosed herein also include a method for making a food bar. The method includes combining a sesame component with nutritional yeast and water, placing the combination with the sesame component in a mold, forming an indent in the combination, heating the combination for a predetermined time period to form a crust, cooling the combination, and filling the combination with a filler.

Certain embodiments disclosed herein also include a method for making a food bar. The method includes combining a sesame component, placing the combination with the sesame component in a mold, forming an indent in the combination, cooling the combination, and filling the combination with a filler.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
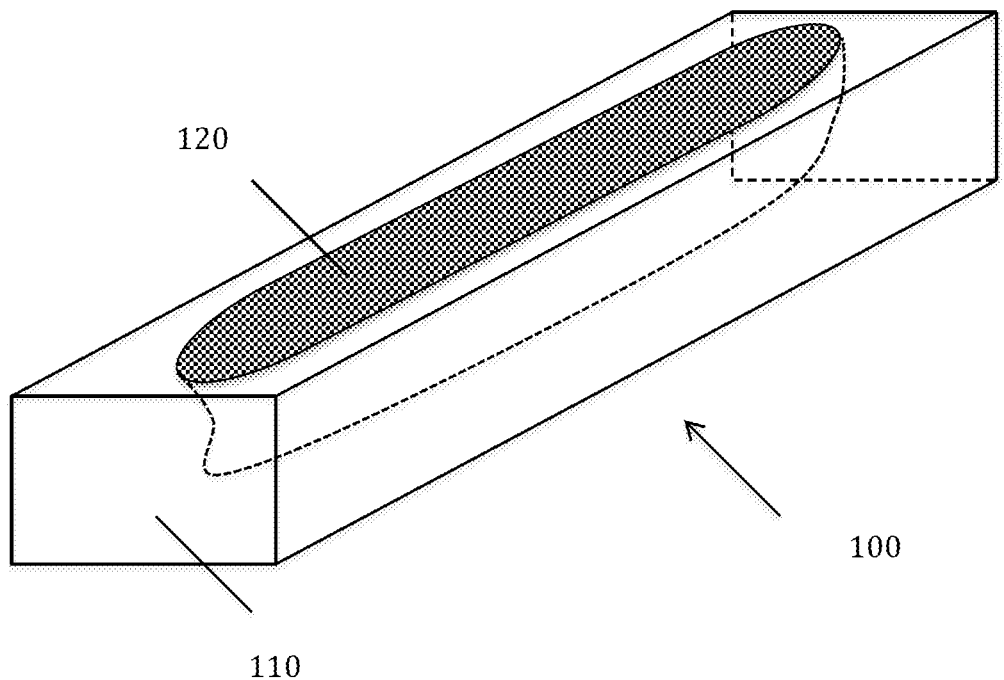
FIG. 1 is a diagonal three-dimensional view of a tub-shaped food bar, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a food bar, such as a protein bar, and a method of making the food bar. The food bar utilizes protein-rich sesame in its composition. The neutral taste of sesame allows for sweet and savory assortments of food bars, which allow for appeal to different tastes and dietary needs. A unique process of making the food bar using sesame paste and selected protein powder hardens up after freezing, and do not lose the solid form after unfreezing.

That is, the embodiments provide for a protein-rich barrel, especially in savory products, in a mini-tub-shaped or barrel-shaped crust that allows for a creamy, protein-rich filling that may be stored for extended periods of time without breaking apart. The ratio of the crust as related to the filling make the product easy to consume on the go without creating a mess, a spill, or crumbling of the food bar, while improving taste and texture.

The use of sesame paste in food bars may offer a wide range of nutritional benefits. That is, food bars including sesame paste may have anti-inflammatory properties, (e.g., when individuals consumed 2-3 such food bars a day.

FIG. 1 is a diagonal three-dimensional view of a food bar 100, according to an embodiment. The food bar 100 has an elongated rectangular shape, and includes a tub-shaped crust 110 and a filling 120 within the crust 110. The crust may be made by hand and molded in a custom mode. In an embodiment, a custom machine may also be used to make the crust 110 and mold the crust 110 into a tub-shape. In an embodiment, the crust 110 may have a dimensional ratio of about 4:1:0.75 (length×width×height). This ensures that the food bar 100 is easy to transport and be carried in the pocket of the user without deformation. The crust 110 has a thickness of about 3-4 mm, also includes a binding agent including a sesame component. The filling thickness contributes to maintaining the filling 120 in the crust 110. Also, the sesame component may include a combination of sesame mixed with protein powder, sesame paste, nutritional yeast, water, salt and/or oil.

Sesame powder is generated by isolating sesame protein molecules in sesame flour, which is generated by regular grinding of sesame seeds. Sesame paste, which is also known as tahini, is generated by processing hulled sesame seeds with high-pressure grinders that extracts sesame oil while grinding the seeds, resulting in a paste rather than a powder.

The use of sesame powder and sesame paste act counter-intuitively to each other when mixed. That is, sesame powder is a solid component, while sesame paste is a creamy liquid component. In an embodiment, while making the sweet food bars, mixing the powder and tahini generate a soil-like textured combination. Once this combination is cooled at 32 f or lower, it gains a solid form. Thereafter, the food bar 100 can be kept on the shelf for up to 12 months without deformation or spoiling. That is, the resulting food bar 100 does not flake or break easily.

The use of sesame allows for structural rigidity, while providing a unique texture and taste for the user. Also, sesame is low in sugar, anti-inflammatory, and has high nutritional value. Further, in an embodiment, the sesame powder to sesame paste ratio is about 5:7 by weight % for food bar 100 that may be made to taste sweet. Here, the sesame paste acts counter-intuitively as a binding agent. When the composition is frozen the particles of the dough binds together and never loses its form or structure after unfreezing. In an embodiment where the food bar 100 is savory, where no sweetener of any kind is added, the ratio of the sesame powder to sesame paste in the crust 110 may be about 4:1. By having such a ratio, the right consistency and texture may be obtained.

In an embodiment, it is noted that, as discussed above, the combination is made up of sesame protein flour, tahini (which includes high-pressure crushed sesame, nutritional yeast and water. The sesame oil may be produced by high-pressure stone grinding of the sesame, which extracts the sesame oil from the grounded sesame seeds, which results in a creamy texture. Here, no additional oil needs to be added. When tahini is substituted with plain oil, the result was not the same. That is, since the protein flour is high in protein, the resulting crust that is formed is very tough and hard on the teeth. Based on such an observation, tahini/sesame paste may replace both fat and milk, allowing for a soft enough cracker type crust.

That is, the protein in the tahini improves strength and structure of the crust 110, but at the same time the solids also weaken the connections between the protein powder to create a softer crust 110. Additionally, the use of nutritional yeast, which is not used as a leaving agent, instead of active or dry yeast in the crust 110 adds to the nutrition and flavor of the crust 110.

Additional ingredients may be added to provide for savory flavor, texture, and structural rigidity, including but not limited to nuts (e.g., almonds, walnut, and pine nuts), ground cumin, parsley, mint, tomatoes, cucumber, garlic, basil, pepper, eggplant, and cilantro.

In an embodiment, where the food bar 100 is to be made sweet, the binding agent, which includes sesame paste, may also include naturally sweet ingredients such as honey, molasses, natural ground sugar, and bee pollens may be provided in a viscous syrup to hold the structure of the crust together, while providing a uniquely sweet flavor for the user without requiring any complex industrial processes.

Additional ingredients may be added to provide for additional flavoring, texture, and structure including rolled or toasted oats, flax seed, vanilla extract, dried fruit (e.g., cranberries, blueberries, orange, bananas, coconut flakes, mangos, figs, dates, etc.), coco powder, nuts (almonds, pistachios, pine nuts, peanuts, cashews, etc.), and peanut butter.

In an embodiment, to make two crusts 110 that weigh about 47 g each, 23 g of tahini, 31 grams of sesame protein powder, 23 grams of molasses, 5 grams of vanilla extract, and 12 grams of cranberry may be used. The resulting crust 110 will have a vanilla cranberry flavor.

In another embodiment, along with the tahini, sesame protein powder, and the molasses described above, 3 grams of coco powder, 16 g of dates, and 8 g of unsweetened coconut flakes may be used to make the crust 110. The resulting crust 110 will have a chocolate coconut flavor.

In the embodiment, the filling 120 may include a creamy, pasty savory material of a particular consistency so that the filling 120 attaches easily to the crust 110 without easily spilling out, even when the food bar 100 is tilted or held upside-down. The filling 120 should also be nutritious with low sugar content, and have varied flavors aside from being sweet. Examples of the filling 120 may include hummus, or a chickpeas, and lemon-based paste, pesto, tahini or sesame based paste, spinach dip, artichoke dip, baba ghanouj or eggplant, onion, and oil based paste, etc.

In an embodiment, the crust 110 to filling 120 weight ratio is about 1:1. This allows for cream filling 120 of predetermined texture to sit in, without spilling or creating a mess. Also, such a ratio ensures that the food bar 100 has sufficient structural support by the crust 110 so that the food bar 100 does not crumble or deform easily. Further, the texture of the food bar 100 will not be too dry to the taste, since there will be enough creamy filing 120 to ensure that there is enough moisture in the food bar 100 to make it easy to chew and swallow.

In the embodiment, the cream filling texture may have the following mechanical property range: an average peak force of about 360-390 g, an average hardness work done of about 51-61 mj, an average adhesive force of about 165-194 g, and an average adhesiveness of about 32-37 mj. By having these mechanical properties, the filling 120 is prevented from spilling since it can better attach to the crust 110. Also, the particular texture associated with these mechanical characteristic makes the food bar 100 easier to chew, and to swallow, and thus, more satisfying to taste for the consumer.

Figure 2A:
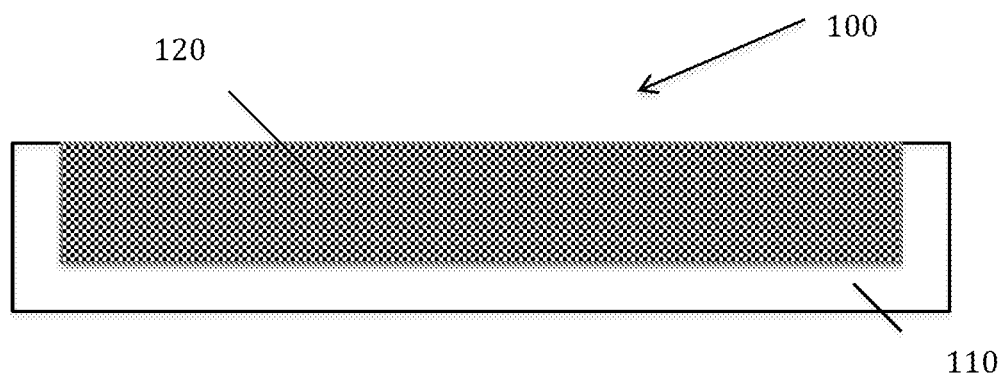
FIG. 2A is a lengthwise cross-sectional view of a food bar having a rectangular tub-shaped indented crust, according to the embodiment.

FIG. 2A is a lengthwise cross-sectional view of a food bar 100 having a rectangular, tub-shaped indented crust 110, according to the embodiment. The tub-shaped food bar 100 includes a crust 110 and a filling 120, as previously described regarding in FIG. 1. Here, the crust 110 is rectangular, with a length-wise regular tub-shaped indentation opening from a top side of the crust 110 and extending along the length of the crust, where filling 120 may be placed within. When viewed in the lengthwise cross-sectional view, the crust 110 is U-shaped, with vertical walls positioned perpendicularly to a horizontal base. The top opening of the crust 110 ensures that the filling 120 may be placed easily within the crust 110.

Figure 2B:
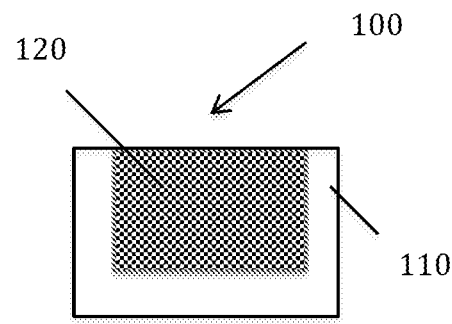
FIG. 2B is a widthwise cross-sectional view of the food bar with the rectangular tub-shaped indented crust, according to the embodiment.

FIG. 2B is a widthwise cross-sectional view of the food bar 100 described in 2A, according to the embodiment. When viewed in the widthwise cross-sectional view, the crust 110 is also U-shaped with vertical walls perpendicularly to the horizontal base.

By having the rectangular, tub-shaped indentation, maximum amount of filling 120 may be placed within the crust 110, ensuring that there is sufficient moisture, nutrition and taste for the user.

In an embodiment, an additional layer, which may include sweet component, may further be formed to envelope the food bar 100. This way, a salty and sweet combination may result, further adding to the taste of the food bar 100.

Figure 3A:
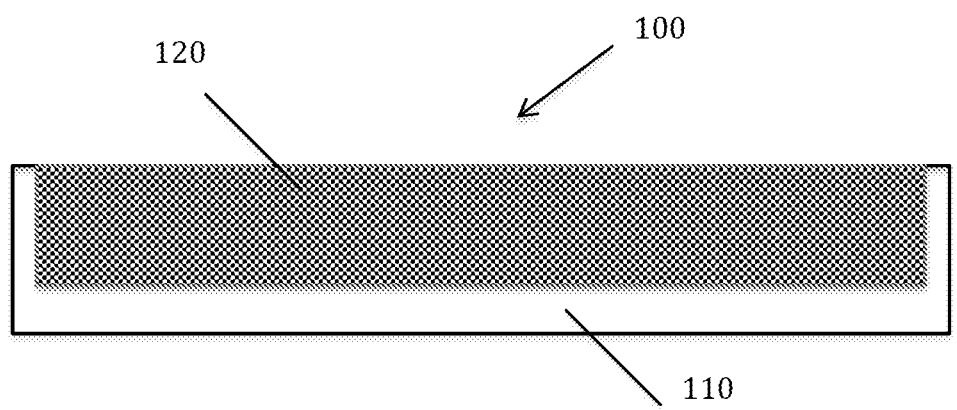
FIG. 3A is a lengthwise cross-sectional view of a food bar with a cylindrical, barrel-shaped crust, according to another embodiment.

FIG. 3A is a lengthwise cross-sectional view of the food bar 100 with a cylindrical, barrel-shaped crust, according to an embodiment. Here, the food bar 100 includes a crust 110 and a filling 120, as previously described regarding in FIG. 1. Here, the crust 110 has a cylindrical, barrel-shaped indentation. From a lengthwise cross-sectional view, the crust 110 is rectangular, with a length-wise regular tub-shaped indentation opening from a top side of the crust 110 and extending along the length of the crust, where filling 120 may be placed within, similar to FIG. 2A.

Figure 3B:
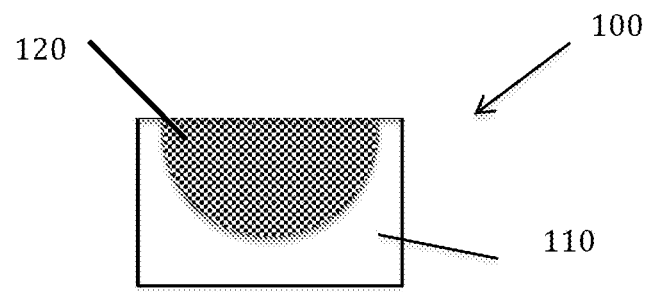
FIG. 3B is a widthwise cross-sectional view of the food bar with a cylindrical, barrel-shaped crust, according to the other embodiment.

FIG. 3B is a widthwise cross-sectional view of the food bar 100 with the cylindrical, barrel shaped crust described in 3A, according to the embodiment. When viewed in the widthwise cross-sectional view, the crust 110 is barrel, or circular-shaped.

By having a barrel, or circular shaped indentation for the crust 110, structural rigidity of the food bar 100 is enhanced. This way, the food bar 100 is less prone to breaking, and it is less likely that the filling 120 will spill and cause a mess.

Figure 4A:
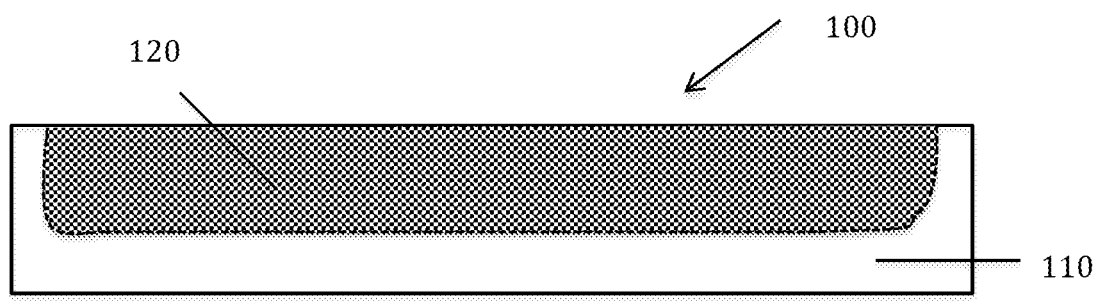
FIG. 4A is a lengthwise cross-sectional view of a food bar with a rounded, rectangular tub-shaped crust, according to the other embodiment.

FIG. 4A is a lengthwise cross-sectional view of a food bar with a rounded, rectangular tub-shaped crust, according to the other embodiment. Here, the food bar 100 includes a crust 110 and a filling 120, as previously described regarding in FIG. 1. From a lengthwise cross-sectional view, the crust 110 is indented in a U shape similar to what is presented in 2A. However, the edges of the indentation where the vertical walls and the horizontal base of the crust 110 meet are rounded.

Figure 4B:
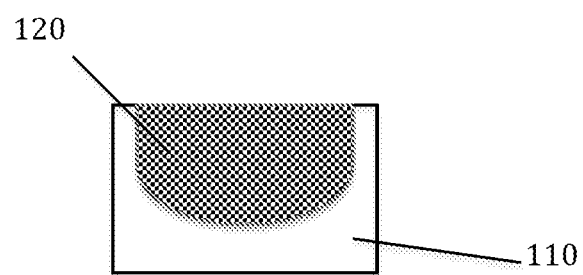
FIG. 4B is a widthwise cross-sectional view of the food bar with the rounded, rectangular tub-shaped crust, according to the other embodiment

FIG. 4B is a widthwise cross-sectional view of the food bar with the rounded, rectangular tub-shaped crust, according to the embodiment. When viewed in the widthwise cross-sectional view, the crust 110 has a rounded U-shaped.

In a sense, the shape of the crust 110 is a hybrid of the tub-shaped and the barrel-shaped crusts 110 as presented by FIG. 2A/B and FIG. 3A/B. By having such as rounded u-shape, best of the benefits presented by the embodiments of FIG. 2A/B and FIG. 3A/B are achieved. That is, amount of the filler 120 placed in the indentation of the crust may be maximized, while structural rigidity of the food bar 100 is enhanced. This way, the food bar 100 is less prone to breaking, and it is less likely that the filling 120 will spill and cause a mess. At the same time, sufficient moisture and taste are maintained by the filling 120.

Figure 5A:
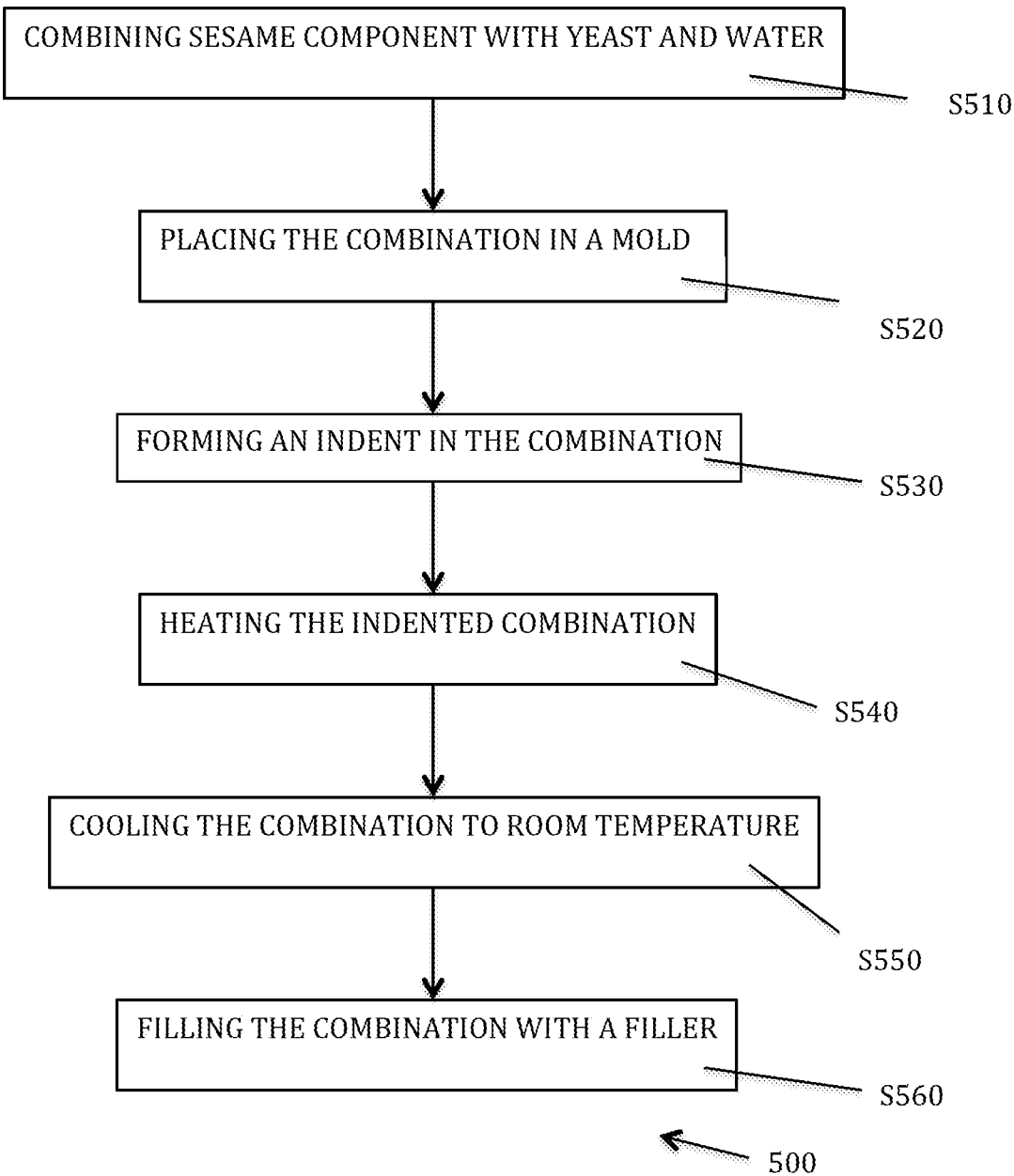
FIG. 5A is a flowchart of a method of making a savory food bar, according to another embodiment.

FIG. 5A is a flowchart 500 of a method of making a savory food bar 100, according to an embodiment. At S510, a sesame component, which may include sesame paste or sesame mixed with protein powder, is combined a sesame component with nutritional yeast and water to form a dough. Next, at S520, the combination with the sesame component is placed in a mold. Afterwards, at S530, an indent is formed in the combination of dough. In an embodiment, the indent may be rectangular tub-shaped, as described in FIGS. 2A and 2B. In another embodiment, the indent may be barrel-shaped, as described in FIGS. 3A and 3B.

Next, at S540, the combination is heated. In an embodiment, the combination is heated at about 450 f and for about fifteen minutes to bind the combination and form the crust 110 from the dough. Heating the combination binds the ingredients, with the sesame paste component replacing both milk and oil in providing both the hardening and softening agent to the crust 110.

Afterwards, at S550, the heat source is removed and the crust 110 formed is cooled to room temperature. Then, at S560, the crust 110 is combined with the filler 120, which may include a variety of ingredients as discussed in FIG. 1.

The food bar 100 as produced has protein-rich sesame in its composition. The neutral taste of sesame allows for sweet and savory assortments of food bar 100, which allow for appeal to different tastes and dietary needs.

That is, the embodiments provide for a protein-rich crust 110, especially in savory products, in a mini-tub-shaped crust 110 that allows for a creamy, protein-rich filler 120 that may be stored for extended period of time without breaking apart. The ratio of the crust 110 as related to the filler 120 make the product easy to consume on the go without creating a mess, a spill, or crumbling of the food bar, while improving taste and texture.

Additionally, The use of sesame paste in food bar 120 may offer a wide range of nutritional benefits. That is, food bars 120 including sesame paste may have anti-inflammatory properties, (e.g., when individuals consumed 2-3 such food bars a day).

Figure 5B:
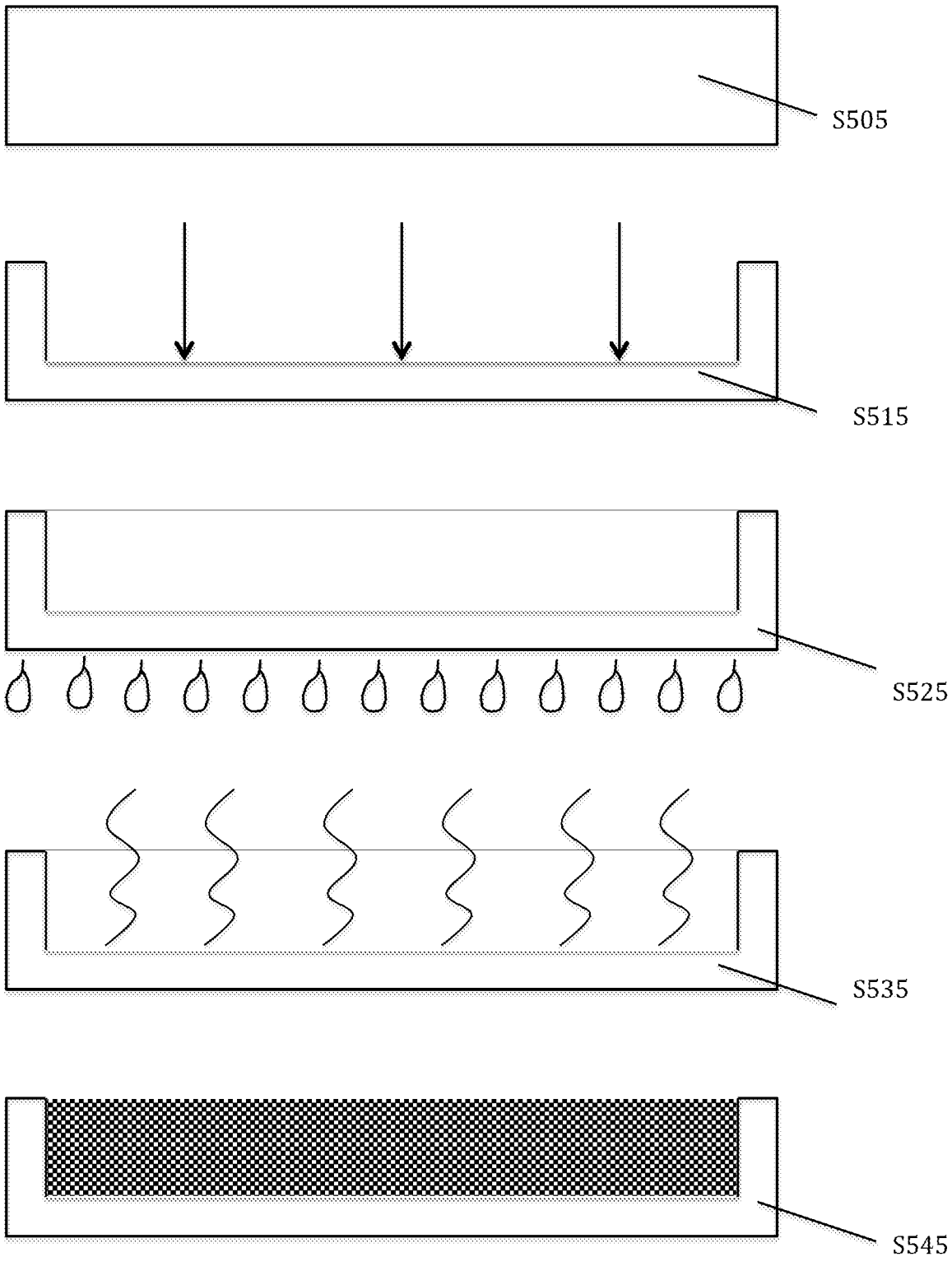
FIG. 5B is a pictorial diagram of the method of making the savory food bar, according to the other embodiment.

FIG. 5B is a pictorial diagram 505 of the method of making the savory food bar, according to the other embodiment. Similar to FIG. 5A, at S505, a sesame component, which may include sesame paste or sesame mixed with protein powder, is combined a sesame component with nutritional yeast and water to form a dough, and molded into a rectangular bar in a mode. Next, at S515, an indent is formed in the combination of dough, by applying pressure from above the dough and moving excess dough to the sides of the combination to form vertical walls and a horizontal base where the pressure is applied. Pressure may be applied to the combination using a mechanical press, or by hand. In an embodiment, the indent may be rectangular tub-shaped, as described in FIGS. 2A and 2B. In another embodiment, the indent may be barrel-shaped, as described in FIGS. 3A and 3B.

Next, at S525, the combination is heated. In an embodiment, the combination is heated at about 450 f and for about fifteen minutes in an oven to bind the combination and form the crust 110 from the dough. Afterwards, at S535, the heat source is removed and the crust 110 formed is cooled to room temperature. Then, at S545, the crust 110 is combined with the filler 120, which may include a variety of ingredients as discussed in FIG. 1.

In an embodiment, the crust 110 is baked on its own. Then, after cooling down at room temperature or through a cooling tunnel, the crust 110 is filled with a thick cream-textured filler 120. The crust 110 must cool down before adding the filler 120 to avoid spoilage of the fresh ingredients (ex.hummos or parsley) for the filler 120, and also to avoid the water content in the filler 120 from being absorbed to the hot crust surface, thus spoiling the overall texture.

In an embodiment, an additional layer, which may include sweet component, may further formed to envelope the food bar 100 after S545. This way, a salty and sweet combination may result, further adding to the taste of the food bar 100.

In an embodiment, to make two crusts 110, 21 g sesame protein powder is mixed with 5 g nutritional yeast, 5 g sesame paste, and 0.5 g bagel seasoning, and 18 g of water is added. The combination is mixed until a homogeneous dough forms. The dough is pressed into a rectangle mold having a 4*1*0.75 length/width/height ratio, adding pressure at the center to level the dough while raising the edges until a tub-shaped crust 110 is formed. The combination is then baked in the oven for 15 mins at 450 degrees. As an alternative embodiment, the tub shape can be cylindrical. Afterwards, with the crust 110 cooled to room temperature, the crust 110 is filled with edible filler 120 (be it hummus, pesto, spinach dip, etc.). Here, the filler 120 can be mixed with protein powder for added nutritional value. In an embodiment, the bagel seasoning may be placed on the mold prior placing the dough combination.

Figure 6:
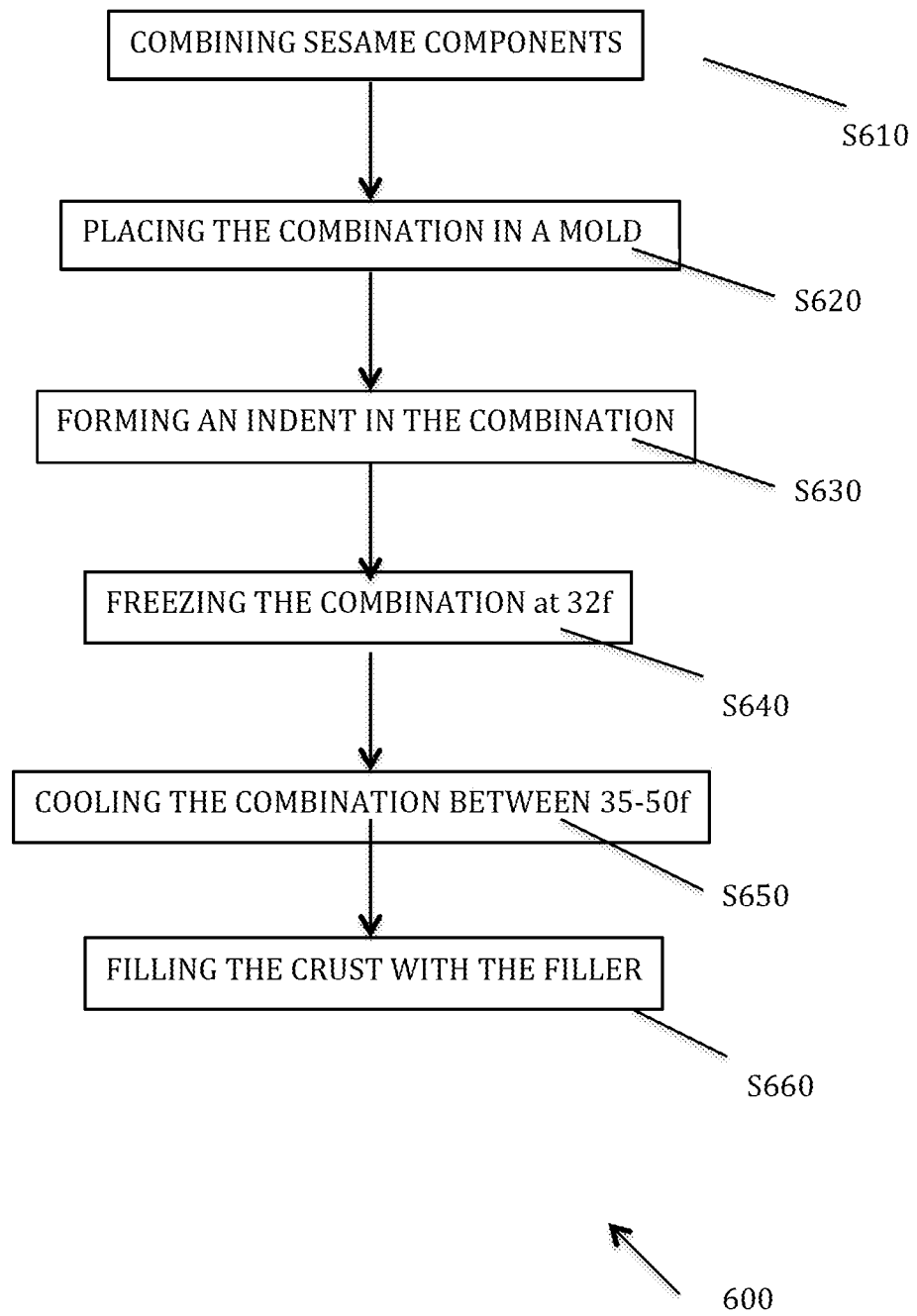
FIG. 6 is a flowchart of a method of making a sweet food bar, according to another embodiment.

FIG. 6 is a flowchart 600 of a method of making a sweet food bar, according to another embodiment. The processes of S610-S630 are similar to those of S510-S530 in FIG. 5A, and will not be repeated here unless otherwise noted. During the combining at S610, as distinguished from S510, no additional water or nutritional yeast is used. However, additional whole ingredients for flavoring (i.e., flavoring agents including dates, cranberry, vanilla, coconut, chocolate, etc.) and a syrup or sweetener may be added. That is, in an embodiment, for the sweet/raw food bar 110, unlike the savory one) is made by mixing 21 g sesame powder with 15 g sesame paste. Other whole ingredients used as agents for flavoring in addition to a sweetener such as molasses may also be used.

When the sweetener and other ingredients are used, the weight ratio between sesame powder to sesame paste may be about 5:7. No water is added when heating does not occur because adding water to the combination in spoilage and short shelf life. Also, adding water interferes with the binding process. Further, the sesame paste, syrup and sweetener already provides moisture to the texture. Therefore, when the food bar 110 is formed, no additional water is added aside from what already exists in the ingredients. Additionally, the food bar 110 does not have to be barrel-shaped and can instead be made to be rectangular bar-shaped.

In S640, the molded combination is then frozen. In an embodiment, the crust 110 that is formed in this process may be frozen at about 32 f, or near freezing temperature, for a predetermined time period of about three to four hours, to allow the crust 110 to form a particular hardness. Then, at S650, the formed crust 110 is allowed to additionally cool above freezing at about 35-50 f for a second time period of about two hours. This allows the crust 110 to be unfrozen and set its consistency and structural rigidity. Cooling may be done in a cooling tunnel. Then, at S660, the crust 110 is filled with the filler 120.

It is noted that the yeast used in the baked crust is nutritional yeast, it does not act like regular dry or active yeast. Regular baking yeast is a single-cell organism that converts sugar and starch through fermentation into carbon dioxide and alcohol, which eventually make baked goods rise. Nutritional yeast on the other hand, which is used here to add protein and nutritional value, and enhance the taste and texture of the crust. It is used counter intuitively as it is not usually used in baking.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C;

3A; A and B in combination; B and C in combination; A and C in combination; A, B, and C in combination; 2A and C in combination; A, 3B, and 2C in combination; and the like.

What is claimed is:

1. A food bar, comprising:
   a bar body formed without baking, having:
   a binding agent including a sesame paste, and a sesame powder mixed with the sesame paste, wherein the weight ratio between the sesame powder and the sesame paste is about 5:7 to maintain structural integrity of the bar without added water.

2. The food bar of claim 1, wherein the food bar is water-avoidant.

3. The food bar of claim 1, wherein the food bar is raw.

4. The food bar of claim 1, wherein the food bar is dairyless.

5. A food bar, comprising:
   a raw bar body formed without heating, comprising:
   a binding agent consisting of sesame paste, and sesame flour, wherein:
   a weight ratio between the sesame powder and the sesame paste is about 5:7, and
   the food bar is dairyless.

6. The food bar of claim 1, wherein the food bar is made without additional water.

7. The food bar of claim 5, wherein the entire bar body is made without additional water to prevent spoilage and prolong shelf life.

* * * * *